United States Patent
Youm et al.

(10) Patent No.: US 8,929,713 B2
(45) Date of Patent: Jan. 6, 2015

(54) APPARATUS AND METHOD FOR SEGMENTING VIDEO DATA IN MOBILE COMMUNICATION TERMINAL

(75) Inventors: Sun-Hee Youm, Seoul (KR); Jin-Guk Jeong, Yongin-si (KR); Mi-Hwa Park, Anyang-si (KR); Soo-Hong Park, Yongin-si (KR); Min-Ho Lee, Gwacheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/411,458

(22) Filed: Mar. 2, 2012

(65) Prior Publication Data
US 2012/0224833 A1 Sep. 6, 2012

(30) Foreign Application Priority Data
Mar. 2, 2011 (KR) ........................ 10-2011-0018377

(51) Int. Cl.
| | | |
|---|---|---|
| H04N 9/80 | (2006.01) | |
| H04N 9/82 | (2006.01) | |
| H04N 5/77 | (2006.01) | |
| G11B 27/00 | (2006.01) | |
| H04N 5/93 | (2006.01) | |

(52) U.S. Cl.
CPC ............ H04N 9/8205 (2013.01); H04N 5/772 (2013.01)
USPC ........... 386/239; 386/242; 386/248; 386/278; 386/280; 386/285; 386/286

(58) Field of Classification Search
USPC .......... 386/239, 242, 248, 278, 280, 285, 286
See application file for complete search history.

(56) References Cited

U.S. PATENT DOCUMENTS

| | | | |
|---|---|---|---|
| 5,714,997 A * | 2/1998 | Anderson ....................... 348/39 |
| 8,310,542 B2 * | 11/2012 | Girgensohn et al. ........... 348/143 |
| 2002/0097322 A1 * | 7/2002 | Monroe et al. ................. 348/159 |
| 2004/0143434 A1 | 7/2004 | Divakaran et al. |
| 2010/0277650 A1 | 11/2010 | Matsuzaki |
| 2012/0173927 A1 * | 7/2012 | Rymeski et al. ................. 714/26 |
| 2012/0188376 A1 * | 7/2012 | Chatow et al. ................. 348/148 |

FOREIGN PATENT DOCUMENTS

| | | |
|---|---|---|
| JP | 10285501 | 10/1998 |
| JP | 2004342252 | 12/2004 |
| KR | 20070002159 A | 1/2007 |
| KR | 1020070102382 A | 10/2007 |
| KR | 1020080041835 A | 5/2008 |
| KR | 1020080041837 A | 5/2008 |
| KR | 1020090080720 A | 7/2009 |

OTHER PUBLICATIONS

International Search Report dated Sep. 27, 2012 in connection with International Patent Application No. PCT/KR2012/001386, 3 pages.
Written Opinion of International Searching Authority dated Sep. 27, 2012 in connection with International Patent Application No. PCT/KR2012/001386, 3 pages.

* cited by examiner

*Primary Examiner* — Daquan Zhao

(57) ABSTRACT

In one embodiment, a method for segmenting video data in a mobile communication terminal includes acquiring sensor data periodically together with video data during video shooting, and segmenting the video data based on the acquired sensor data.

20 Claims, 5 Drawing Sheets

APPARATUS AND METHOD FOR SEGMENTING VIDEO DATA IN MOBILE COMMUNICATION TERMINAL

CROSS-REFERENCE TO RELATED APPLICATION(S) AND CLAIM OF PRIORITY

The present application is related to and claims priority under 35 U.S.C. §119 to an application filed in the Korean Intellectual Property Office on Mar. 2, 2011 and assigned Serial No. 10-2011-0018377, the contents of which are incorporated herein by reference.

TECHNICAL FIELD OF THE INVENTION

The present invention relates generally to a mobile communication terminal, and in particular, to an apparatus and method for segmenting video data in a mobile communication terminal.

BACKGROUND OF THE INVENTION

Video segmentation is a technique that segments video data for jumping to a specific playback position within a video and playing the video from the specific playback position.

One particular conventional video segmentation technique uses a video analyzing method to separate news services by distinguishing speakers through a voice analysis or the like, or to notify the change of an image by distinguishing a difference between images.

However, such a video analyzing method may often not provide an adequate segmentation technique. Therefore, as in the case of a chaptering service in a Digital Video Disk (DVD) or the like, video data segmented by an author's arbitrary decision in a contents creating step have been distributed.

SUMMARY OF THE INVENTION

To address the above-discussed deficiencies of the prior art, it is a primary object to provide at least the advantages below. Accordingly, an object of the present invention is to provide an apparatus and method for segmenting video data in a mobile communication terminal.

Another object of the present invention is to provide an apparatus and method for segmenting video data based on sensor data in a mobile communication terminal.

Another object of the present invention is to provide an apparatus and method for segmenting video data based on sensor data by storing video data and sensor data acquired from a variety of sensors, together with a playback position (or playback time) offset value of the corresponding video data, during video shooting in a mobile communication terminal.

Another object of the present invention is to provide an apparatus and method for storing a changed sensor data value of a current period in comparison with a previous period and a playback position (or playback time) offset value of corresponding video data for each sensor in a metadata storage space within a video file configured with the video data in a metadata format in a mobile communication terminal.

According to an aspect of the present invention, a method for segmenting video data in a mobile communication terminal includes: acquiring sensor data periodically together with video data during video shooting; and segmenting the video data based on the acquired sensor data.

According to another aspect of the present invention, an apparatus for segmenting video data in a mobile communication terminal includes: a camera unit for acquiring video data through video shooting; a sensor unit for acquiring sensor data periodically during the video shooting; and a video segmenting unit for segmenting the video data based on the acquired sensor data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE PREFERRED EMBODIMENTS

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communications terminals. In the following description, detailed descriptions of well-known functions or configurations will be omitted since they would unnecessarily obscure the subject matters of the present invention. Also, the terms used herein are defined according to the functions of the present invention. Thus, the terms may vary depending on users' or operators' intentions or practices. Therefore, the terms used herein must be understood based on the descriptions made herein.

Hereinafter, an apparatus and method for segmenting video data based on sensor data in a mobile communication terminal according to exemplary embodiments of the present invention will be described.

Although a mobile communication terminal will be described below as one example, it is apparent that the present invention can also be applied to any device that is provided with a built-in sensor (or connected to an external sensor) and is capable of shooting or playing a video.

Figure 1:
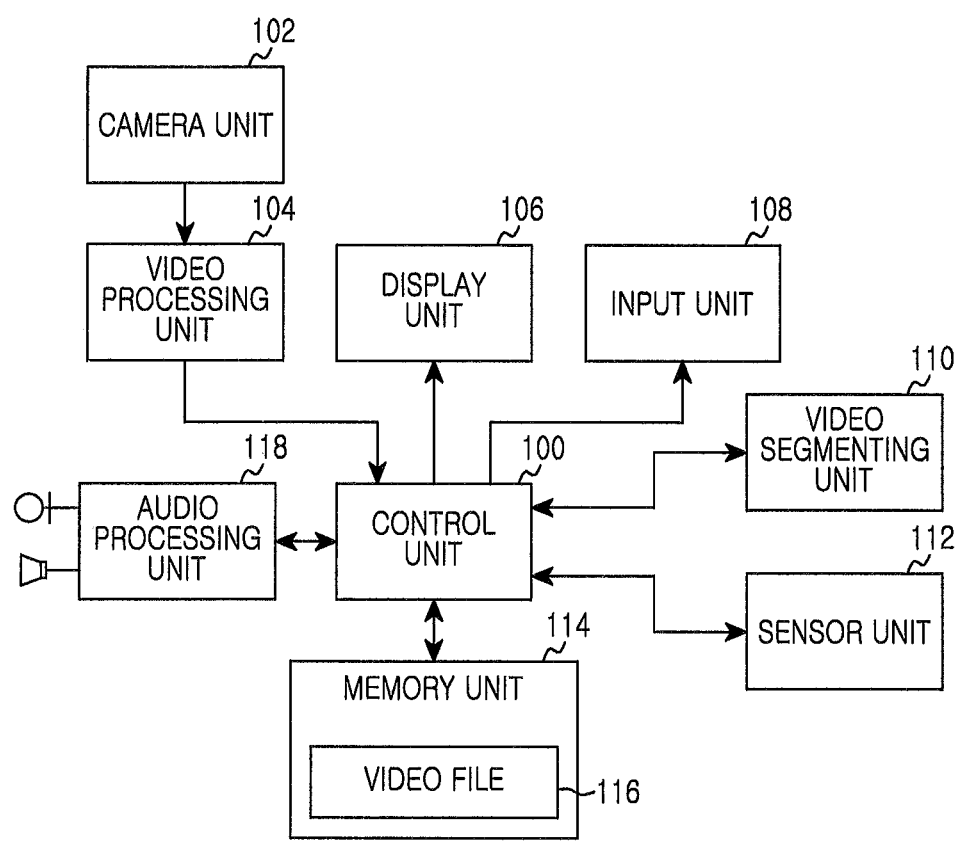
FIG. 1 illustrates an example configuration of a mobile communication terminal according to an embodiment of the present invention.

FIG. 1 illustrates an example configuration of a mobile communication terminal according to an exemplary embodiment of the present invention. The mobile communication terminal includes a control unit 100, a camera unit 102, a video processing unit 104, a display unit 106, an input unit 108, a video segmenting unit 110, a sensor unit 112, a memory unit 114, and an audio processing unit 118.

The control unit 100 controls an overall operation of the mobile communication terminal and processes a function of segmenting video data based on sensor data.

The camera unit 102 includes a camera sensor and a signal processor. The camera sensor converts an optical signal detected during video shooting into an electrical signal. The signal processor converts an analog video signal from the camera sensor into digital video data. In certain embodiments, the camera sensor may be a Charge Coupled Device (CCD) sensor, and the signal processor may be a Digital Signal Processor (DSP).

The video processing unit 104 generates screen data for displaying camera video data received from the camera unit 102. The video processing unit 104 includes a video codec (not shown) that codes video data in accordance with a specified protocol or decodes coded video data into original video data.

The display unit 106 displays information, such as numerals and characters, moving pictures and still pictures, and status information generated during the operation of the mobile communication terminal. The display unit 106 may be a color Liquid Crystal Display (LCD) or other display device.

The input unit 108 includes alpha-numeric keys and a plurality of function keys. The input unit 108 provides the control unit 100 with key input data that corresponds to a key pressed by a user.

Upon video shooting, the video segmenting unit 110 segments video data based on sensor data by storing the video data and the sensor data acquired from a variety of sensors in the memory unit 114, together with a playback position (or playback time) offset value of the corresponding video data.

The sensor unit 112 includes one or more sensors. For example, the sensor unit 112 may include a position sensor (for example, a Global Positioning System (GPS)), a temperature sensor, an orientation sensor, a noise sensor, and the like. The sensor may be built in the mobile communication terminal, or may be configured outside the mobile communication terminal and coupled to the mobile communication terminal via a wired or wireless connection.

The memory unit 114 stores a variety of reference data, instructions of an executable program for processing and controlling the control unit 100, temporary data generated during the execution of various programs, and/or updatable backup data. In particular, the memory unit 114 stores an executable program for segmenting the video data based on the sensor data. In addition, the memory unit 114 may store a video file 116.

The audio processing unit 118 includes an audio codec 107 that processes an audio signal such as a voice signal. In particular, the audio processing unit 118 may process an audio signal from the control unit 100 and plays the processed audio signal through a speaker, or may process an audio signal from a microphone and provides the processed audio signal to the control unit 100.

Figure 2:
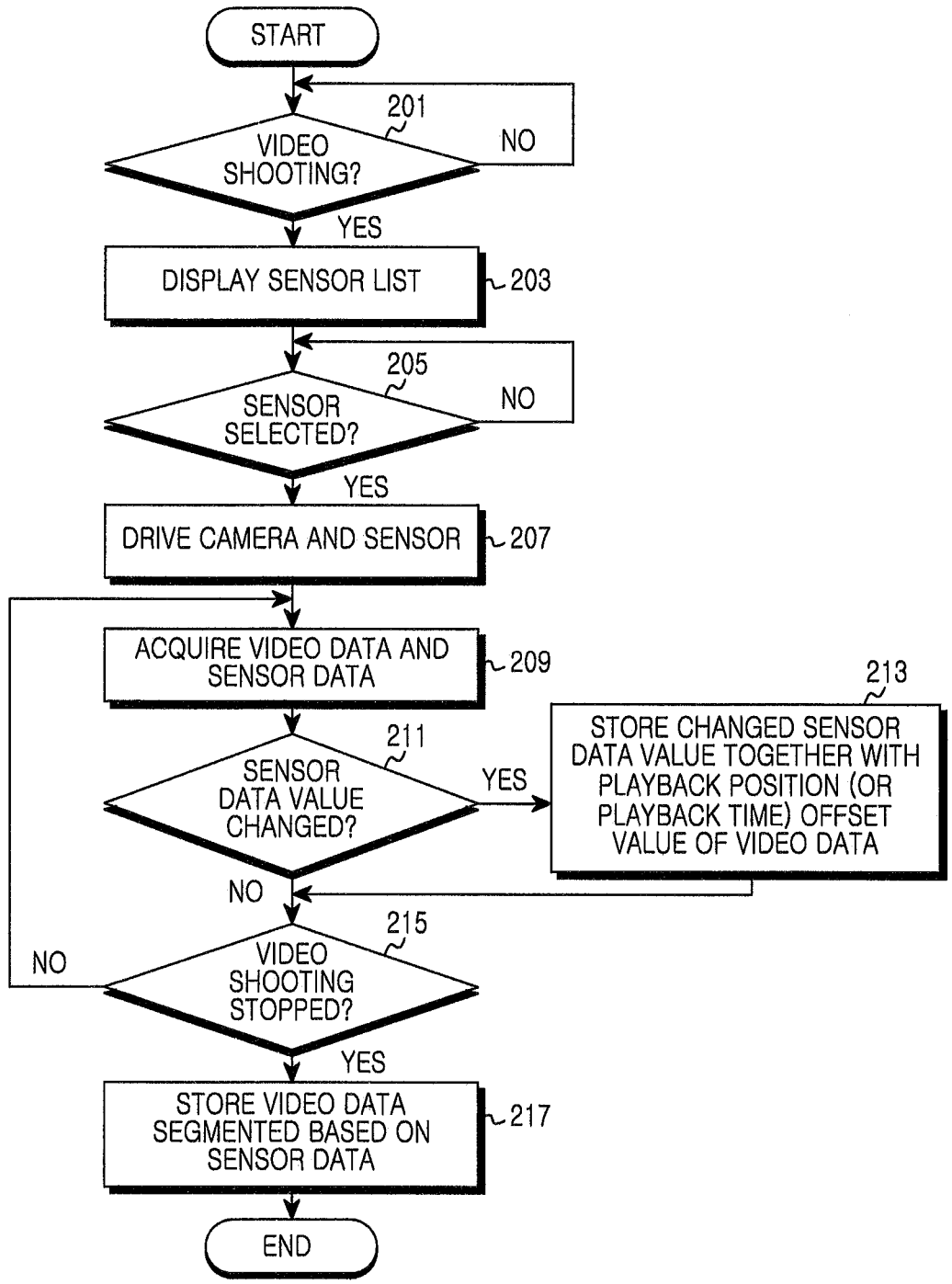
FIG. 2 illustrates an example method for segmenting video data based on sensor data in a mobile communication terminal according to an exemplary embodiment of the present invention.

FIG. 2 illustrates an example method for segmenting video data based on sensor data in a mobile communication terminal according to an exemplary embodiment of the present invention. The mobile communication terminal determines whether video shooting is requested according to a user's key manipulation in step 201. If so, the mobile communication terminal displays a sensor list on a screen in order to allow the user to select one or more sensors to be used to segment video data in step 203. The sensor list may include a position sensor, such as a GPS device, a temperature sensor, an orientation sensor, a noise sensor, and the like.

In step 205, the mobile communication sensor determines whether one or more sensors are selected from the sensor list displayed on the screen. For example, if it is intended to check a shooting position of a current video and store a moving path of the video shooting together with the video data, the user may select the position sensor and use the selected position sensor to segment the video data. When it is determined in step 205 that one or more sensors are selected from the sensor list displayed on the screen, the mobile communication terminal drives a camera and the selected sensor(s) in step 207.

In step 209, the mobile communication terminal acquires video data by shooting a video through the driven camera, and acquires sensor data periodically through the driven sensor (s). For example, the sensor data may include a position value, a temperature value, an orientation value, a noise value, and the like.

Figure 4:
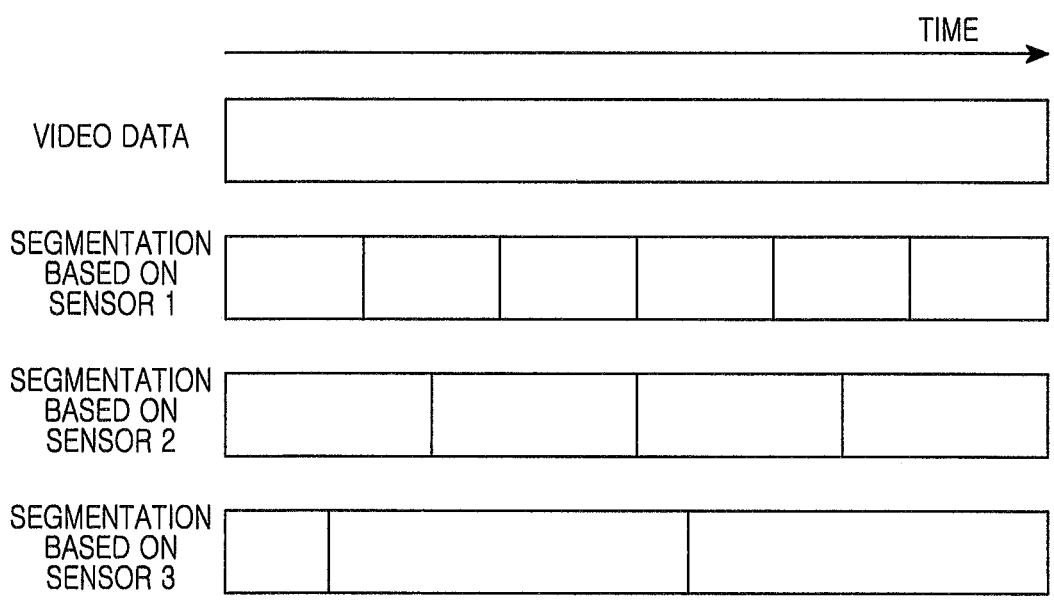
FIG. 4 illustrates an example method for segmenting video data based on sensor data in a mobile communication terminal according to an exemplary embodiment of the present invention.

In step 211, the mobile communication terminal compares sensor data acquired at a current period with sensor data acquired at a previous period with respect to each selected sensor, and checks whether the sensor data value has changed. If so, the mobile communication terminal determines that a current playback position (or playtime time) of the video data is a playback position (or playback time) requiring the video data to be segmented based on the sensor data, and stores the changed sensor data value together with a playback position (or playback time) offset value of the video data in step 213. Then, the mobile communication terminal proceeds to step 215. As such, while the mobile communication terminal shoots the video, it segments the video data by storing the changed sensor data value of the current period in comparison with the previous period together with the playback position (or playback time) offset value of the corresponding video data with respect to each sensor. Accordingly, as illustrated in FIG. 4, a plurality of video data segmented based on the sensor data of each sensor may be created.

Figure 5:
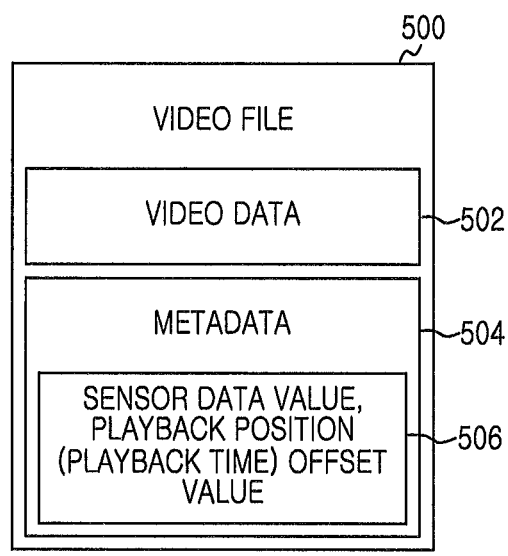
FIG. 5 illustrates an example format of video data according to an exemplary embodiment of the present invention.

As one example, which is illustrated in FIG. 5, the changed sensor data value of the current period in comparison with the previous period with respect to each sensor and the playback position (or playback time offset value of the corresponding video data may be stored in a metadata format in the metadata 504 storage space within the video file 500 configured with the video data 502. That is, the changed sensor data value and the playback position (or playback time) offset value may be stored separately from the video data within the corresponding video data. As another example, the changed sensor data value and the playback position (or playback time) offset value may be stored within the corresponding video data.

On the other hand, if it is determined from the sensor data comparison of step 211 that the sensor data value is not changed, the mobile communication terminal proceeds to step 215. In step 215, the mobile communication terminal determines whether it is requested to stop video shooting according to the user's key manipulation. If it is determined in step 215 that the mobile communication terminal is requested to stop the video shooting according to the user's key manipulation, the mobile communication terminal stores the video data segmented based on the sensor data acquired periodically through the driven sensor(s) in step 217. On the other hand, if it is checked in step 215 that it is not requested to stop the video shooting according to the user's key manipulation, the mobile communication terminal returns to step 209 and repeats the subsequent steps.

Thereafter, the mobile communication terminal ends the process of FIG. 2.

Figure 3:
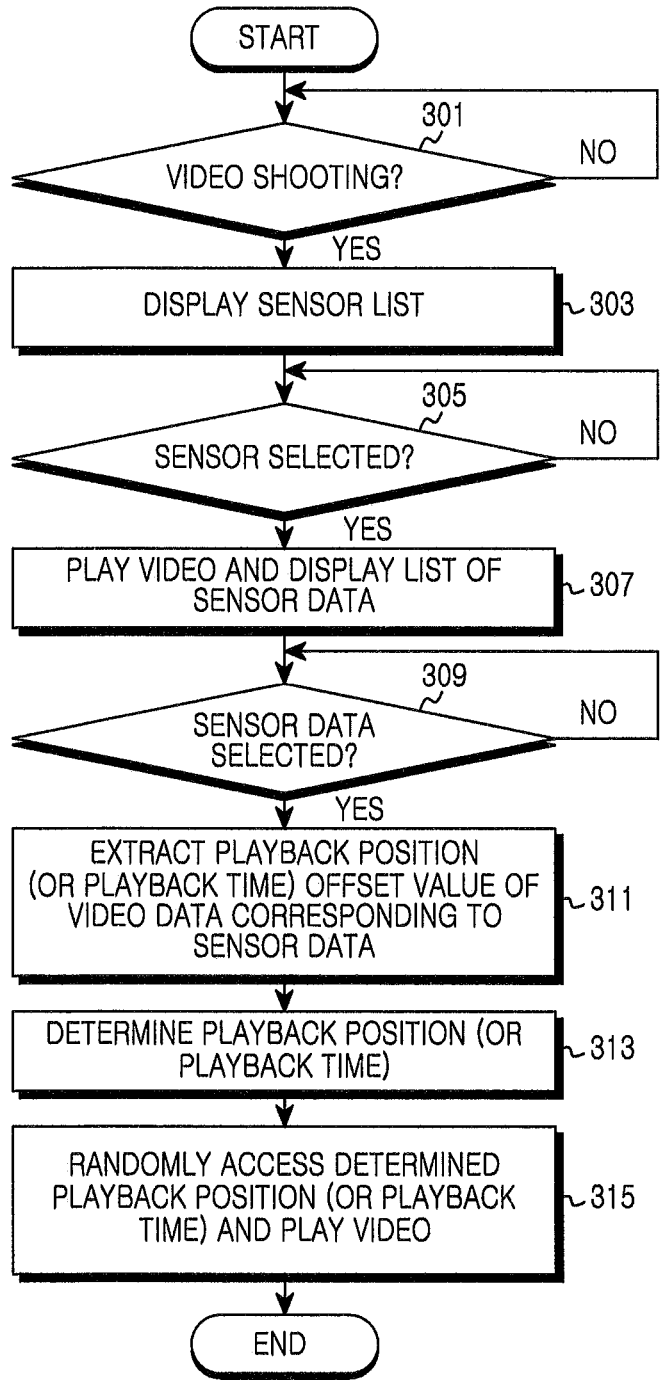
FIG. 3 illustrates an example method for playing video data segmented based on sensor data in a mobile communication terminal according to an exemplary embodiment of the present invention.

FIG. 3 illustrates an example method for playing video data segmented based on sensor data in a mobile communication terminal according to an embodiment of the present invention. Referring to FIG. 3, the mobile communication terminal checks whether video shooting is requested according to a user's key manipulation in step 301. If so, the mobile communication terminal displays a sensor list on a screen in order to allow the user to select one or more sensors to be used to segment video data in step 203. The sensor list may include a position sensor, such as a GPS, a temperature sensor, an orientation sensor, a noise sensor, and the like.

In step 305, the mobile communication sensor checks whether one or more sensors are selected from the sensor list displayed on the screen. If so, the mobile communication terminal plays the corresponding video in step 307 and displays a list of sensor data on the screen, which have been previously stored during the shooting of the corresponding video with respect to each selected sensor. For example, the sensor data may include a position value, a temperature value, an orientation value, a noise value, and the like.

In step 309, the mobile communication terminal determines whether one sensor data is selected from the sensor data list displayed on the screen. If so, the mobile communication terminal extracts a playback position (or playback time) offset value of the video data, which is previously stored together with the selected sensor data during the shooting of the corresponding video in step 311.

In step 313, the mobile communication terminal determines a playback position (or playback time) of the corresponding video data based on the extracted playback position (or playback time) offset value of the video data.

In step 315, the mobile communication terminal randomly accesses the determined playback position (or playback time) and plays the corresponding video data. For example, upon video shooting, in the case where a video shooting position is checked through a position sensor and a moving path of the video shooting is stored together with the video data, or the respective videos shot in the above-described manner are edited into a single video and stored, and if the user wants to directly find the video shot in a specific area and play the corresponding video when viewing the video after the completion of the video shooting, the mobile communication terminal may directly jump to the video of the corresponding area and play the corresponding video, based on the sensor data that is provided from the position sensor and stored together with the video data during the video shooting.

Thereafter, the mobile communication terminal ends the process of FIG. 3.

As such, when the mobile communication terminal shoots the video, the video data and the sensor data acquired from the various sensors are stored together with the playback position (or playback time) offset value of the corresponding video data, and the corresponding video data is segmented based on the sensor data. Accordingly, more diverse video services may be provided to the user, based on the sensor data. As one example, a video search based on the sensor data may be achieved through a video search service. For instance, regarding a video shot by a user while traveling France, Germany, and Sweden, and entitled 'France,' the corresponding video could be searched only when a search word is 'France.' However, according to the embodiment of the present invention, video data related to the corresponding regions within the video file can be searched and played even when the search word is 'Germany' or 'Sweden'. Therefore, the search accuracy and convenience can be increased.

When the mobile communication terminal shoots the video, the video data and the sensor data acquired from the various sensors are stored together with the playback position (or playback time) offset value of the corresponding video data, and the corresponding video data is segmented based on the sensor data. Accordingly, more diverse video services may be provided to the user, based on the sensor data (for example, the position value, the temperature value, the orientation value, the noise value, and the like).

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for segmenting video data in a mobile communication terminal, the method comprising:
   displaying a sensor list on a screen when the video shooting is requested;
   selecting at least one sensor in the sensor list prior to driving a camera;
   driving the camera and the at least one sensor after the selection of the at least one sensor from the sensor list;
   acquiring sensor data periodically together with video data during video shooting; and
   when a position sensor is selected, segmenting the video data acquired using the camera into variable length segments based on a geographic location of the mobile communication terminal at a time the video data were acquired.

2. The method of claim 1, wherein the sensor data comprises at least one of a position value, a temperature value, an orientation value, and a noise value.

3. The method of claim 1, wherein the sensor list comprises the position sensor and at least one of a temperature sensor, an orientation sensor, and a noise sensor.

4. The method of claim 1, wherein the segmenting of the video data comprises:
   determining whether a sensor data value has changed by comparing sensor data acquired at a current period with sensor data acquired at a previous period; and
   if the sensor data value has changed, storing the changed sensor data value together with a playback position or playback time offset value of the video data.

5. The method of claim 4, wherein the changed sensor data value and the playback position or playback time offset value of the video data are stored in a metadata format in a metadata storage space within a video file configured with the video data.

6. The method of claim 4, wherein the changed sensor data value and the playback position or playback time offset value of the video data are stored in the video data.

7. The method of claim 1, further comprising:
when the playback of the segmented video data is requested, displaying a sensor list;
when the at least one sensor is selected from the sensor list, displaying a list of sensor data used to segment the video data by the selected at least one sensor;
when one sensor data is selected from the list of sensor data, extracting a playback position or playback time offset value of a video data, which is previously stored together with the selected sensor data;
determining a playback position or playback time of a corresponding video data based on the extracted playback position or playback time offset value of the video data; and
randomly accessing the determined playback position or playback time and playing the corresponding video.

8. The method of claim 1, wherein segmenting the video data comprises:
segmenting the video data into a plurality of video segments, wherein each of the video segments correspond to respective periods of time when a value from at least one of the at least one sensor is unchanged.

9. A mobile communication terminal comprising:
a camera unit configured to acquire video data through video shooting;
a sensor unit configured to acquire sensor data periodically during the video shooting; and
a video segmenting unit configured to segment the acquired video data into variable length segments based on the acquired sensor data; and
a control unit configured to display a sensor list on a screen when the video shooting is requested, to identify a selection of at least one sensor in the sensor list prior to driving a camera, and to drive the camera and the at least one sensor after the selection of the at least one sensor from the sensor list,
wherein when a position sensor is one selected, the video segmenting unit is configured to segment the acquired video data into the variable length segments based on a geographic location of the mobile communication terminal at a time the video data were acquired.

10. The mobile communication terminal of claim 9, wherein the sensor data comprises at least one of a position value, a temperature value, an orientation value, and a noise value.

11. The mobile communication terminal of claim 9, further comprising a display unit configured to display a sensor list when the video shooting is requested, wherein, when one or more sensors are selected from the sensor list, the video segmenting unit configured to control a camera using the selected one or more sensors.

12. The mobile communication terminal of claim 11, wherein the sensor list comprises the position sensor and at least one of a temperature sensor, an orientation sensor, and a noise sensor.

13. The mobile communication terminal of claim 9, wherein the video segmenting unit is configured to compare sensor data acquired at a current period with sensor data acquired at a previous period and determine whether a sensor data value is changed and, if the sensor data value is changed, the video segmenting unit is configured to store a playback position or playback time offset value of the video data and the changed sensor data value.

14. The mobile communication terminal of claim 13, wherein the changed sensor data value and the playback position or playback time offset value of the video data are configured to be stored in a metadata format in a metadata storage space within a video file configured with the video data.

15. The mobile communication terminal of claim 13, wherein the changed sensor data value and the playback position or playback time offset value of the video data are stored in the corresponding video data.

16. The mobile communication terminal of claim 9, further comprising a display unit configured to display a sensor list when the playback of the segmented video data is requested, and display a list of sensor data used to segment the video data by one or more sensors that are selected from the sensor list;
wherein when one sensor data is selected from the list of sensor data, the video segmenting unit configured to extract a playback position or playback time offset value of the video data previously stored together with the selected sensor data, determine a playback position or playback time of a corresponding video data based on the extracted playback position or playback time offset value of the video data, randomly access the determined playback position or playback time, and play the corresponding video.

17. The mobile communication terminal of claim 9, wherein the video segmenting unit is configured to segment the video data into a plurality of video segments, wherein each of the video segments correspond to respective periods of time when a value from at least one of the at least one sensor is unchanged.

18. A non-transitory computer readable medium embodying a computer program, the computer program comprising computer readable program code configured to cause a processor to:
control display of a sensor list on a screen when the video shooting is requested;
select at least one sensor in the sensor list prior to driving a camera;
drive the camera and the at least one sensor after the selection of the at least one sensor from the sensor list;
acquire sensor data periodically together with video data during video shooting; and
when a position sensor is selected, segment the video data acquired using the camera into variable length segments based on a geographic location of the mobile communication terminal at a time the video data were acquired.

19. The computer program of claim 18, wherein the sensor list comprises the position sensor and at least one of a temperature sensor, an orientation sensor, and a noise sensor.

20. The computer program of claim 18, further comprising code configured to:
when the playback of the segmented video data is requested, display a sensor list;
when the at least one sensor is selected from the sensor list, display a list of sensor data used to segment the video data by the selected at least one sensor;
when one sensor data is selected from the list of sensor data, extract a playback position or playback time offset value of a video data, which is previously stored together with the selected sensor data;
determine a playback position or playback time of a corresponding video data based on the extracted playback position or playback time offset value of the video data; and randomly access the determined playback position or playback time and play the corresponding video.

* * * * *